(Model.)
H. J. BURNWORTH.
CUTTER BAR.
No. 284,813. Patented Sept. 11, 1883.
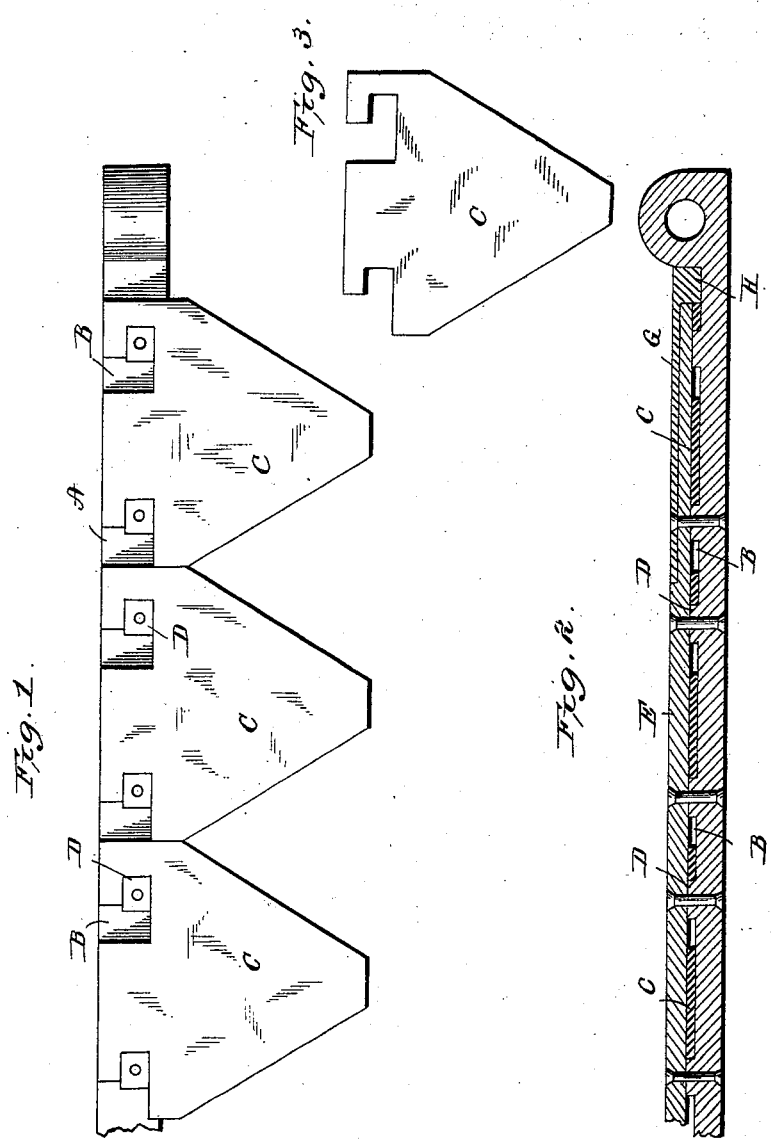
Witnesses.
Edwin L. Yewee.
Chas. D. Davis
Inventor.
H. J. Burnworth,
By L. M. Alexander
Attorney.

UNITED STATES PATENT OFFICE.

HEZEKIAH J. BURNWORTH, OF KIMBOLTON, OHIO.

CUTTER-BAR.

SPECIFICATION forming part of Letters Patent No. 284,813, dated September 11, 1883.

Application filed May 22, 1883. (Model.)

*To all whom it may concern:*

Be it known that I, H. J. BURNWORTH, a citizen of the United States, residing at Kimbolton, in the county of Guernsey and State of Ohio, have invented certain new and useful Improvements in Cutter-Bars, of which the following is a specification, reference being had therein to the accompanying drawings.

This invention relates to certain improvements in cutter-bars for harvesters; and it has for its objects to provide for securing the cutters thereto in such manner that they may be readily removed and replaced, as required. These objects I attain by the means illustrated in the accompanying drawings, in which—

Figure 1 represents a plan view of my improved cutter-bar with the upper portion of the same removed. Fig. 2 represents a longitudinal vertical sectional view of the same, and Fig. 3 represents a view of one of the cutters or knives detached.

The letter A indicates the cutter-bar proper, which is provided with a series of recesses, B, on its upper side, for the reception of the cutters or knives C. The said cutters or knives are formed of sheet-steel, as usual. At their rear edges the said cutters or knives are shaped or slotted, as indicated clearly in Fig. 3 of the drawings, the said rear portions being so formed as to engage and be held by the portions D of the cutter-bar when in place. The slots at one edge of the cutters or knives are open laterally and the others rearwardly, so that when in position they will engage the projections on the cutter-bar, and be locked and secured by the same when the whole are in position, and advanced and held, as shown in Fig. 1 of the drawings.

The letter E indicates a plate or bar, which is secured to the cutter-bar proper, and which serves to hold the cutters or knives in place. The said plate or bar is secured to the cutter-bar by means of bolts or rivets or other fastening devices, and at one end is provided with a spring, G, which operates as a detent to hold the knives or cutters in place, the said spring being provided with a catch, H, which is adapted to set into one of the slots in the cutters or knives and hold the series in position on the cutter-bar.

The operation of my invention will be understood from the above description, and is as follows: The knives or cutters are secured in their respective recesses by setting their rear slotted portions in the same and moving them to the left, so as to cause the slotted portions to be properly engaged. The spring on the upper plate, when all of the knives or cutters are in place, engages the last of the series, and holds the whole in position.

Having thus described my invention, what I claim, and desire to secure by Letters Patent, is—

The combination, with the cutter-bar having suitable recesses for the reception of the knives or cutters, slotted, as described, of the upper plate or bar secured to the cutter-bar and the spring secured above the upper plate or bar, whereby the knives or cutters are held in place, substantially as and for the purposes specified.

In testimony whereof I affix my signature in presence of two witnesses.

HEZEKIAH J. BURNWORTH.

Witnesses:
ROBERT McKAHAN,
MARGARET McKAHAN.